(12) United States Patent
Masuda

(10) Patent No.: US 10,246,064 B2
(45) Date of Patent: Apr. 2, 2019

(54) ELECTRIC BRAKE DEVICE

(71) Applicant: NTN CORPORATION, Osaka-shi, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/486,892

(22) Filed: Apr. 13, 2017

(65) Prior Publication Data
US 2017/0217409 A1 Aug. 3, 2017

Related U.S. Application Data

(63) Continuation of application No. PCT/JP2015/078294, filed on Oct. 6, 2015.

(30) Foreign Application Priority Data

Oct. 16, 2014 (JP) ................. 2014-211500

(51) Int. Cl.
*B60T 13/74* (2006.01)
*B60T 8/172* (2006.01)
(Continued)

(52) U.S. Cl.
CPC ............. *B60T 8/172* (2013.01); *B60T 7/12* (2013.01); *B60T 8/17* (2013.01); *B60T 13/74* (2013.01);
(Continued)

(58) Field of Classification Search
CPC ... B60T 7/12; B60T 8/17; B60T 8/172; B60T 13/741; F16D 65/18; F16D 2121/24; F16D 2125/34
See application file for complete search history.

(56) References Cited

U.S. PATENT DOCUMENTS 6,464,308 B2   10/2002   Kubota
7,129,658 B2   10/2006   Ether
(Continued)

FOREIGN PATENT DOCUMENTS

CN   1509925 A    7/2004
CN   101675271 A  3/2010
(Continued)

OTHER PUBLICATIONS

International Search Report dated Dec. 28, 2015 in corresponding International Application No. PCT/JP2015/078294.
(Continued)

Primary Examiner — Thomas W Irvin

(57) ABSTRACT

Improved maneuverability, improved followability towards a target braking force and enhanced brake feeling when a low braking force is being effected may be achieved. A brake controller unit may include a clearance estimator which may be configured to use a rotational angle θ of a motor to estimate a clearance, inclusive of negative values, between a frictional material and a brake. A target braking force $F_r$ may be compared with a switch-determining braking force $F_{rsw}$, so that clearance control based on a target clearance $C_r$ may be performed when the frictional material is in approximate-contact state corresponding to the target braking force $F_r$ being low, and so that braking force control may be performed when it is equal to or greater than the switch-determining braking force $F_{rsw}$.

8 Claims, 6 Drawing Sheets

(51) Int. Cl.
*F16D 55/225* (2006.01)
*B60T 7/12* (2006.01)
*B60T 8/17* (2006.01)
*F16D 65/18* (2006.01)
*F16D 121/24* (2012.01)
*F16D 125/34* (2012.01)

(52) U.S. Cl.
CPC .......... *B60T 13/741* (2013.01); *F16D 55/225* (2013.01); *F16D 65/18* (2013.01); *F16D 2121/24* (2013.01); *F16D 2125/34* (2013.01)

(56) References Cited

U.S. PATENT DOCUMENTS

| | | | |
|---|---|---|---|
| 7,448,699 B2 | 11/2008 | Manaka | |
| 7,810,616 B2 | 10/2010 | Nakazeki | |
| 8,376,094 B2 | 2/2013 | Yamasaki et al. | |
| 8,864,244 B2 | 10/2014 | Leiber et al. | |
| 9,227,611 B2* | 1/2016 | Gilles | B60T 8/3275 |
| 9,228,648 B2* | 1/2016 | Yamasaki | F16D 55/00 |
| 9,501,063 B2* | 11/2016 | Masuda | F16D 65/18 |
| 9,709,112 B2* | 7/2017 | Masuda | F16D 65/18 |
| 9,746,041 B2* | 8/2017 | Masuda | B60T 13/741 |
| 9,856,936 B2* | 1/2018 | Masuda | F16D 65/18 |
| 9,915,308 B2* | 3/2018 | Masuda | B60T 13/741 |
| 2002/0027387 A1 | 3/2002 | Kubota | |
| 2002/0104718 A1 | 8/2002 | Suzuki | |
| 2004/0104619 A1 | 6/2004 | Manaka | |
| 2008/0048596 A1* | 2/2008 | Konishi | B60T 7/042 318/372 |
| 2008/0110704 A1 | 5/2008 | Nakazeki | |
| 2010/0084230 A1 | 4/2010 | Yamasaki et al. | |
| 2011/0006596 A1 | 1/2011 | Leiber et al. | |
| 2011/0031072 A1 | 2/2011 | Leiber et al. | |
| 2014/0262634 A1 | 9/2014 | Yamasaki et al. | |
| 2017/0002881 A1* | 1/2017 | Masuda | F16D 65/18 |

FOREIGN PATENT DOCUMENTS

| | | |
|---|---|---|
| CN | 103958919 A | 7/2014 |
| EP | 2 772 659 A1 | 9/2014 |
| FR | 2 855 611 A1 | 12/2004 |
| JP | 6-327190 | 11/1994 |
| JP | 2000-264186 | 9/2000 |
| JP | 2001-278021 | 10/2001 |
| JP | 2001-343036 | 12/2001 |
| JP | 2002-81475 | 3/2002 |
| JP | 2005-67248 A | 3/2005 |
| JP | 2006-194356 | 7/2006 |
| JP | 2010-215202 | 9/2010 |
| JP | 2011-506187 | 3/2011 |
| WO | WO 2009/083216 A2 | 7/2009 |

OTHER PUBLICATIONS

Extended European Search Report dated Jul. 6, 2018 in corresponding European patent Application No. 15851528.8, 7 pgs.
Office Action dated May 30, 2018 in corresponding Chinese Patent Application No. 201580055322.9, 9 pgs.
International Preliminary Report on Patentability dated Apr. 27, 2017 in corresponding International Patent Application No. PCT/JP2015/078294.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2015/078294, filed Oct. 6, 2015, which is based on and claims Convention priority to Japanese patent application No. 2014-211500, filed Oct. 16, 2014, the entire disclosure of which is herein incorporated by reference as a part of this application.

BACKGROUND OF THE INVENTION (Field of the Invention)

The present invention relates to an electric brake device that may be applied to a vehicle such as various types of automotive vehicles and relates, in particular, to control thereof (Description of Related Art)

In the technical field of conventional electric brake devices, an electric linear actuator using planetary rollers has been proposed (Patent Document 1). An electric brake using a linear motion mechanism, an electric motor and a speed reducer or reduction gear has also been proposed (Patent Document 2). Further, techniques have been proposed in which switching from one control gain to another takes place between contact state and non-contact state of a friction pad of an electric brake (Patent Document 3).

RELATED DOCUMENT

Patent Document

[Patent Document 1] JP Laid-Open Patent Publication No. 2006-194356

[Patent Document 2] JP Laid-Open Patent Publication No. H06-327190

[Patent Document 3] JP Laid-Open Patent Publication No. 2000-264186

SUMMARY OF THE INVENTION

With an electric brake device such as those of Patent Documents 1 to 3, it is typical to perform braking force control by controlling an electric motor such that a braking force estimated from e.g. an axial load on a linear actuator, a motor current, a speed or a deceleration of a wheel, or a deceleration of a vehicle follows a predetermined target value. However, it is challenging to control a braking force with precision during a regime of low braking forces, thereby possibly leading to deterioration of brake feeling.

For instance, in case of control techniques based on a detected axial load, it can be difficult to accurately detect extremely small loads that may be generated when a frictional material slightly touches a brake rotor. To address this, a complex construction or the provision of multiple sensors may be required. Even when such an issue of detection accuracy mentioned above is overcome, generation of a certain braking force in the absence of any axial load input—which is commonly referred to as "drag torque"—may occur because of factors such as tilting of a brake caliper in a disc brake and scooping of a holder by a friction pad. This particular braking force may be difficult to estimate using the axial load detection scheme.

Also, in case of control techniques based on a motor current, similar issues to that of the aforementioned techniques based on an axial load may arise. In addition, eliminating the influence from frictional resistance and inertia of an electric actuator can be extremely difficult, especially when effecting low braking forces.

Furthermore, in case of these techniques based on the axial load or the motor current, no change in an axial load or a motor current occurs until a frictional material actually comes into contact with a brake rotor. As a result, an excessive braking force may be generated upon the contact therebetween due to the influence from inertia of an actuator. To address such an issue, a technique such as that of Patent Document 3 has been proposed in which a frictional material and a brake rotor are caused to gradually contact with each other. However, this may hinder a rapid braking operation, thereby leading to deterioration of feeling or to increase of a braking distance.

As another example, in case of control techniques based on a speed or a deceleration of a wheel or a deceleration of a vehicle, eliminating the influence from e.g. a slope of a road surface, variation of air resistance caused by change in wind direction and wind speed, or change of road conditions can be extremely difficult, especially when effecting low braking forces.

An object of the present invention is to provide an electric brake device which may overcome the foregoing drawbacks and which may enable, when a low braking force is being effected, achieving improved maneuverability, improved followability towards a target braking force and enhanced brake feeling.

For facilitation of better understanding of the present invention, the following description of the present invention contains reference signs from embodiments of the present invention—though solely for convenience.

An electric brake device according to the present invention includes:
 a brake rotor 41;
 a frictional material 45A, 45B configured to come into contact with the brake rotor 41;
 an electric motor 43;
 a motion converter mechanism 44 configured to convert a driving force of the motor 43 into a motion of the frictional material 45A, 45B in a direction towards or away from the brake rotor 41; and
 a brake controller unit 2, the brake controller unit 2 including:
  a motor rotational angle estimator 12 configured to estimate a rotational angle θ of the motor 43;
  a braking force estimator 11 configured to estimate a braking force that is actually being generated;
  a braking force controller 7 configured to control the braking force by controlling the motor 43 in such a way to follow a given target braking force $F_r$;
  a clearance estimator 13 configured to use the rotational angle θ of the motor 43 estimated by the motor rotational angle estimator 12 to estimate a clearance, inclusive of negative values, between the frictional material 45A, 45B and the brake rotor 41; and
  a clearance controller 14 configured to compare the target braking force $F_r$ with a predetermined braking force used for switching determination or predetermined switch-determining braking force $F_{rsw}$, to generate, if the target braking force $F_r$ is below the switch-determining braking force $F_{rsw}$, a target clearance $C_r$ defining the clearance between the frictional material 45A, 45B and the brake rotor 41 which clearance approaches zero or a predetermined negative value $C_{sw}$ as the target braking force $F_r$ increases, and to use the clearance C estimated by the clearance estimator 13 to control the motor 43 in such a way to follow the target clearance $C_r$, in place of control performed by the braking force controller 7 according to the target braking force $F_r$.

The switch-determining braking force $F_{rsw}$ is a value used to determine whether the frictional material 45A, 45B is in approximate contact or partial contact with the brake rotor 41. In this sense, the "clearance controller 14" is a "lining approximate contact controller." The "frictional material" is meant to indicate a brake shoe in case of a drum brake and a brake pad in case of a disc brake.

With such a configuration, based on estimated clearance including approximate-contact state—that is, inclusive of negative values, the clearance controller 14 may compare a target braking force $F_r$ with a predetermined switch-determining braking force $F_{rsw}$, and may perform control of, if the target braking force $F_r$ is below the switch-determining braking force $F_{rsw}$, the clearance between the frictional material 45A, 45B and the brake rotor 41. If a target braking force $F_r$ is equal to or greater than the switch-determining braking force $F_{rsw}$, control of the clearance controller 14 may be performed such that the braking force F estimated by the braking force estimator 11 follows the target braking force $F_r$. As a result, improved followability towards a target braking force $F_r$ may be achieved when effecting a low braking force, thereby leading to improved maneuverability and enhanced brake feeling.

Considering the wearability and so forth of the frictional material 45A, 45B, it may be challenging to control a braking force with precision based on a clearance when effecting a considerably high braking force. To address this, when the target braking force $F_r$ is considerably higher than zero, a conventional type of control that is based on a braking force F estimated by the braking force controller 11 may be performed by the braking force controller 7 in such a way to follow the target braking force $F_r$, thereby ensuring that appropriate control is also performed when effecting a high braking force.

In the present invention, the clearance estimator 13 may be configured to estimate, if the target braking force $F_r$ is equal to or greater than a predetermined value $F_{r0}$ which is smaller than the switch-determining braking force $F_{rsw}$, the clearance based on a relationship between at least two of: the braking force F estimated by the braking force estimator 11; the rotational angle θ of the motor 43 estimated by the motor rotational angle estimator 12; and respective derivative values of these braking force F and rotational angle θ. This may enable estimating the clearance with precision.

In the present invention, a switching coinciding corrector 17 may be provided which is configured to apply correction on at least one of the target clearance $C_r$ and the target braking force $F_r$, such that a braking force, achieved when the clearance reaches a clearance corresponding to the switch-determining braking force $F_{rsw}$ during control according to the target clearance $C_r$ performed by the clearance controller 14, coincides with a braking force achieved when switching takes place from control performed by the clearance controller 14 into control performed by the braking force controller 7 according to the target braking force $F_r$. For example, the correction may apply an offset. By performing such a correction, possible discrepancy of a braking force when switching from one control scheme to another—due to estimation error of the clearance for the frictional material 45A, 45B—may be avoided.

Where the switching coinciding corrector 17 is provided, a coinciding correction execution determiner 18 may be provided which is configured to cause the correction by the switching coinciding corrector 17 to be performed only if one of a deviation of the clearance C estimated by the clearance estimator 13 with respect to the target braking force $F_r$ and a deviation of the braking force F estimated by the braking force estimator 11, as estimated when the clearance reaches a clearance corresponding to the switch-determining braking force $F_{rsw}$ during control performed by the clearance controller 14 according to the target clearance $C_r$, is equal to or smaller than a predetermined value. That is, the aforementioned correction may not need to be performed if a considerably high target braking force $F_r$ is requested with urgency and is far away from an actual braking force. As long as the target braking force $F_r$ is far away from an actual braking force, rapid change of a braking force may be effected without being affected by possible discrepancy of the braking force that may occur when switching from one control scheme to another as mentioned above. Thus, choosing not to perform such correction may allow for more rapid increase of a braking force.

In the present invention, the target clearance $C_r$ in the clearance controller 14 may be defined such that the clearance C estimated by the clearance estimator 13, as estimated when the braking force F estimated by the braking force estimator 11 is down to the switch-determining braking force $F_{rsw}$ during control performed by the braking force controller 7, coincides with a clearance corresponding to the switch-determining braking force $F_{rsw}$ during control performed by the clearance controller 14. With such a configuration, possible discrepancy of a braking force when switching from one control scheme to another—due to e.g. estimation error of a clearance—may be avoided.

In the present invention, a coinciding correction amount eliminator 19 may be provided which is configured to vary correction amount, subsequent to the correction performed by the switching coinciding corrector 17, such that the correction amount gradually approaches zero until the target braking force $F_r$ reaches a value that is greater than the switch-determining braking force $F_{rsw}$ by a predetermined value. If the correction is intended to correct an offset, the coinciding correction amount eliminator 19 may be an offset eliminator. With such a configuration, switching into appropriate control performed by the braking force controller 7 may be made possible without being odd.

The coinciding correction amount eliminator 19 may be configured to serve the following function. For example, in the present invention, a coinciding correction amount eliminator 19 may be provided which is configured to vary correction amount, subsequent to the correction performed by the switching coinciding corrector 17 and if the target braking force $F_r$ changes at a rate of change greater than a predetermined rate of change, such that the correction amount approaches zero.

Also, in the present invention, a coinciding correction amount eliminator 19 may be provided which is configured to vary correction amount, subsequent to the correction performed by the switching coinciding corrector 17, such that the correction amount approaches zero with passage of time.

Any combination of at least two features disclosed in the appended claims and/or the specification and/or the accompanying drawings should be construed as being included within the scope of the present invention. In particular, any combination of at least two claims from the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts throughout the several views, and:

DESCRIPTION OF EMBODIMENTS

Figure 1:
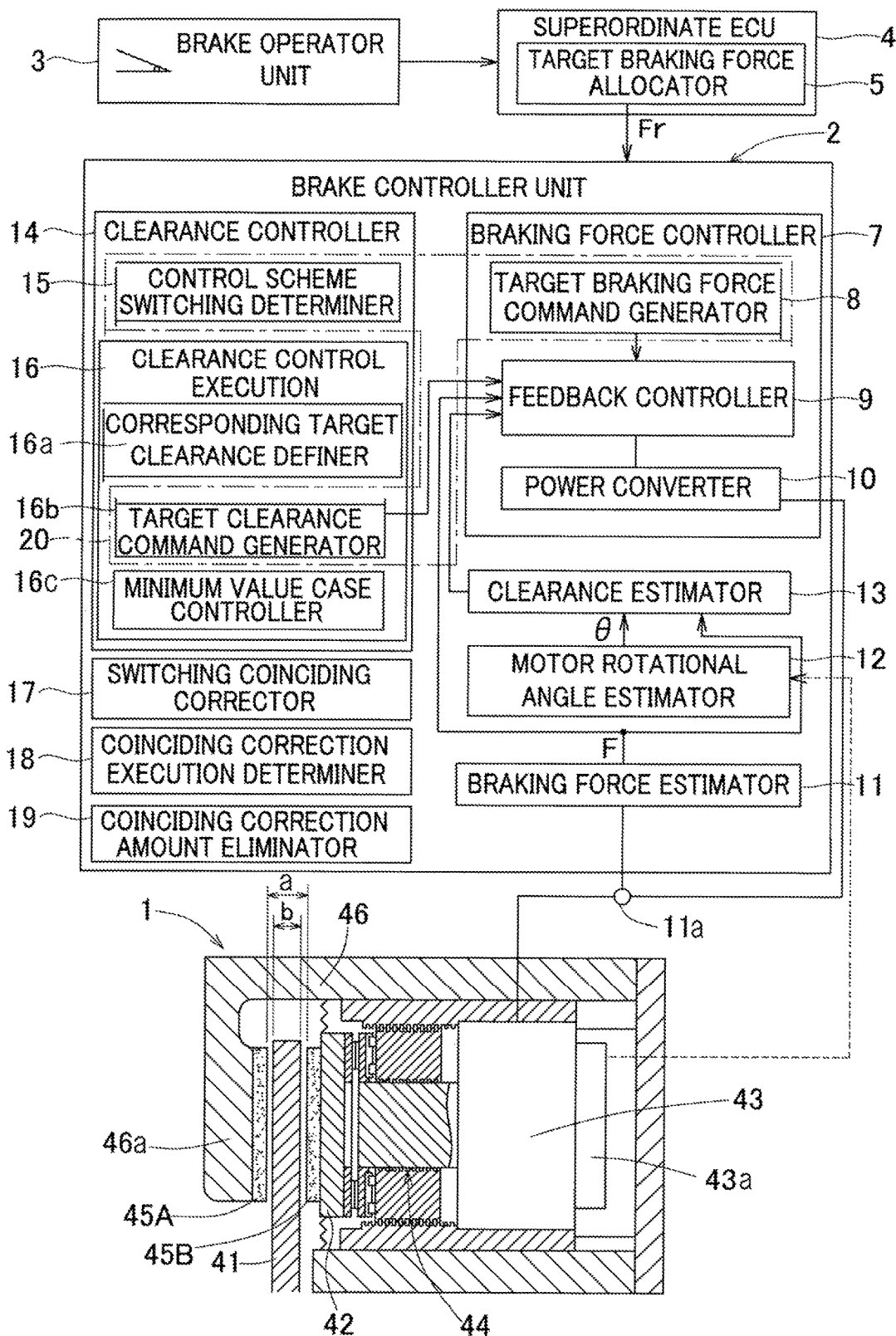
FIG. 1 shows an explanatory diagram including a cross section view of an example of a brake device main unit in an electric brake device as well as including a block diagram of the conceptual configuration of a control system, in accordance with an embodiment of the present invention.

Embodiments of the present invention will now be described with reference to FIGS. 1 to 5. The illustrated electric brake device is intended to be employed for braking a wheel of a vehicle such as an automotive vehicle and may be formed by a brake main unit 1 which is a mechanical unit and a brake controller unit 2 which controls the brake main unit 1.

The brake main unit 1 may include a brake rotor 41 configured to rotate with the wheel, a frictional material mount 42, an electric motor 43, and a motion converter mechanism 44 configured to convert a rotary driving force of the motor 43 into a motion of the frictional material mount 42 in a direction towards or away from the brake rotor 41. The brake main unit 1 may be of a disc brake type in which the disc-shaped brake rotor 41 is intended to be clamped between a frictional material 45A mounted to a pawl portion 46a at a free end of a brake caliper 46 and a frictional material 45B mounted to the frictional material mount 42. In the illustrated example, each of the frictional materials 45A, 45B is a brake pad. It should be noted that, when the frictional materials 45A, 45B are collectively referred to or when discrimination between the frictional materials 45A, 45B is unnecessary, they may be simply indicated as a "frictional material 45." Although in the illustrated example the motion converter mechanism 44 is shown as a linear actuator formed by a speed reducer with planetary rollers, other linear actuator designs such as a ball screw mechanism or a ball ramp may be employed. The motor 43 may include a motor angle detector 43a which, for example, may be formed by a pulse coder or a resolver.

The brake controller unit 2 may control a braking force by controlling the motor 43 of the brake main unit 1 according to a given target braking force and may be implemented by a dedicated ECU (electronic control unit). The target braking force may be given from a brake operator unit 3 such as a brake pedal, via a target braking force allocator 5 in a superordinate ECU 4. The brake operator unit 3 is not limited to such a pedal configuration but may be, for example, a button input configuration or a lever input configuration, as long as it serves as a measure that can be used by an operator to request a braking operation. The target braking force may be given, for example, in the form of a voltage value that indicates a torque value. The superordinate ECU 4 may be a control unit which performs, for example, supervisory control or cooperative control of the vehicle as a whole. The brake controller unit 2 may be provided as part of the superordinate ECU 4. The target braking force allocator 5 may use an LUT (look up table) implemented by software and/or hardware or a predetermined transform function stored in a library of software or equivalent hardware thereto, etc. (which are hereinafter referred to as "implementation model") to generate and output a target braking force in accordance with an output from a sensor (not shown) which varies with an amount of operation of the brake pedal serving as the brake operator unit 3.

The brake controller unit 2 may include, as basic components thereof, a braking force controller 7, which may control a braking force by controlling the motor 43 in such a way to follow the target braking force, and a braking force estimator 11. The braking force controller 7 may include a target braking force command generator module 8, which may be implemented by hardware circuitry or software functions that may use the implementation model such as the one described above to generate a command for subordinate components using the target braking force given from the ECU 4, a feedback controller module 9 and a power converter module 10. The feedback controller module 9 may perform control by using a braking force that is estimated by the braking force estimator 11 and that is fed back to the feedback controller module 9, in such a way to follow the target braking force given from the target braking force command generator module 8. The feedback controller module 9 may, for example, output a signal that controls e.g. switching elements of an inverter. The power converter module 10 may convert an output from the feedback controller module 9 into a power used to drive the motor 43, for output of the power, and may be formed by e.g. an inverter.

The braking force estimator 11 may estimate a braking force that is actually being generated in the brake main unit 1, and may, for example, be formed by a current sensor 11a which may monitor an electric current value of a motor current that flows from the power converter module 10 to the motor 43 or by a component which may monitor a detection value from the current sensor 11a. Or, the braking force estimator 11 may monitor a detection value from a load sensor disposed in the motion converter mechanism 44 of the brake main unit 1. In the latter case, the load sensor may sense a reaction force from the frictional materials 45A, 45B. The braking force estimator 11 may be implemented by hardware circuitry or software functions that may, for example, receive an input of a motor current value or a load sensor detection value to calculate and output an estimation value of a braking force using the implementation model.

In the embodiment under discussion, the brake controller unit 2 may include, in addition to the aforementioned basic components, a clearance controller 14 which may be switched from the braking force controller 7 for use, for example, when the target braking force is low, i.e. when the frictional material 45 is not in complete-contact state but in approximate-contact state. A motor rotational angle estimator 12 and a clearance estimator 13 may be provided in order for control performed by the clearance controller 14.

The motor rotational angle estimator 12 may estimate a rotational angle of a rotor (not shown) of the motor 42, and may be formed by the motor angle detector 43*a* or a component that may monitor a detection value from the motor angle detector 43*a*. Aside from facilitating the provision of the clearance controller 14, the motor rotational angle estimator 12 may be provided in order for the implementation of control performed based on a motor phase by the braking force controller 7, such as vector control, which is intended for achieving better efficiency. The latter may be employed (in combination with the former).

The clearance estimator 13 may estimate a clearance between the frictional materials 45A, 45B and the brake rotor 41, and may be implemented by hardware circuitry or software functions that may receive an input of a rotational angle $\theta$ of the motor 43 that is estimated by the motor rotational angle estimator 12 to estimate (calculate) and output the clearance using the implementation model such as the one described above. In the example under discussion, the clearance estimator 13 may estimate the clearance based on a relationship between at least two of: a braking force estimated by the braking force estimator 11; a rotational angle of the motor 43 estimated by the motor rotational angle estimator 12; and respective derivative values of these braking force and rotational angle. For example, the clearance may be estimated from the braking force estimated by the braking force estimator 11 and the rotational angle of the motor 43 estimated by the motor rotational angle estimator 12. The clearance estimator 13 may be configured to operate only if the target braking force $F_r$ is equal to or greater than a predetermined value $F_{r0}$ which is smaller than a switch-determining braking force $F_{rsw}$ which will be discussed later in detail.

The clearance controller 14 may, for example, be implemented by hardware circuitry or software functions that may use the implementation model such as the one described above which, for this particular component, further includes a comparator implemented by hardware circuitry or software functions. The clearance controller 14 may compare the target braking force $F_r$ with a predetermined switch-determining braking force $F_{rsw}$, to generate, if the target braking force $F_r$ is below the switch-determining braking force $F_{rsw}$, a target clearance $C_r$ defining the aforementioned clearance which clearance approaches zero or a predetermined negative value $C_{sw}$ as the target braking force $F_r$ increases, and to use an estimation value from the clearance estimator 13 to control the motor 43 in such a way to follow the target clearance $C_r$, in place of control performed by the braking force controller 7 according to the target braking force $F_r$. In the example under discussion, the braking force controller 7 may be embodied to include the feedback controller module 9 and the power converter module 10, and control of these modules may be utilized for the operation of the clearance controller 14. The target clearance $C_r$ outputted from the clearance controller 14 may be converted into a voltage value of a voltage signal that represents the target braking force $F_r$ and may be given to the feedback controller module 9.

The clearance controller 14 may include a control scheme switching determiner module 15 and a clearance control execution module 16, both of which will be discussed below in detail. The brake controller unit 2 may further include a switching coinciding corrector 17, a coinciding correction execution determiner 18 and a coinciding correction amount eliminator 19, as components that may enable effective utilization of the clearance controller 14.

The control scheme switching determiner module 15 may define or set the switch-determining braking force $F_{rsw}$, may determine whether or not the target braking force $F_r$ given from the superordinate ECU 4 is below the switch-determining braking force $F_{rsw}$, and may cause, if the target braking force $F_r$ is below the switch-determining braking force $F_{rsw}$, clearance control to be performed by the clearance control execution module 16 and therefore by the clearance controller 14. The switch-determining braking force $F_{rsw}$ may be defined as a relatively small value that corresponds to approximate-contact state of the frictional material 45.

The clearance control execution module 16 may include a corresponding target clearance definer 16*a*, which may define the target clearance $C_r$ corresponding to the target braking force $F_r$—for the target braking force $F_r$ that is below the switch-determining braking force $F_{rsw}$—in the form of a function such as the one shown in FIG. 4A. The clearance control execution module 16 may also include a target clearance command generator 16*b*, which may input the given target braking force $F_r$ to the corresponding target clearance definer 16*a* and which may cause the target clearance $C_r$ to be generated for output of the target clearance $C_r$. As discussed above, the target clearance $C_r$ to be outputted may be converted into a voltage value that indicates a target braking force so that the target clearance $C_r$ can be used by the feedback controller module 9 which is provided in the clearance controller 14. The clearance control execution module 16 may also include a minimum value case controller 16*c*.

The functions and so forth of the minimum value case controller 16*c*, the switching coinciding corrector 17, the coinciding correction execution determiner 18 and the coinciding correction amount eliminator 19 will also be described in the following description.

Figure 5:
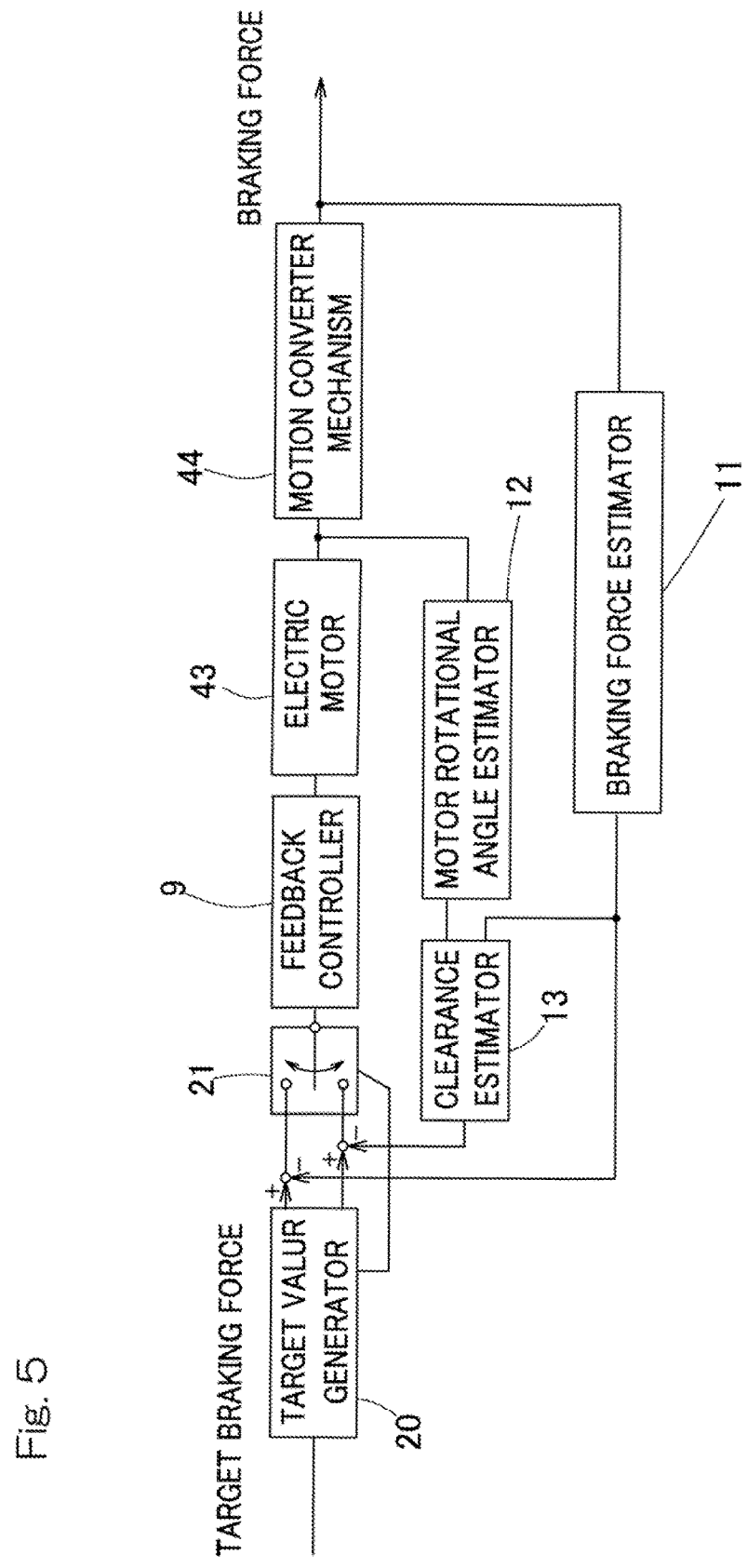
FIG. 5 shows a block diagram illustrating a control operation of the electric brake device.

FIG. 5 shows a block diagram illustrating the overview of control functions in the electric bake device shown in FIG. 1. In FIG. 5, the target braking force command generator module 8, the target clearance command generator 16*b* and the control scheme switching determiner module 15, all shown in FIG. 1, are referred collectively to as a target generator 20, and a measure for switching between clearance control performed by the clearance control execution module 16 shown in FIG. 1 and braking force control performed by the braking force controller 7 shown in FIG. 1 is referred to as a switcher 21.

Figure 3:
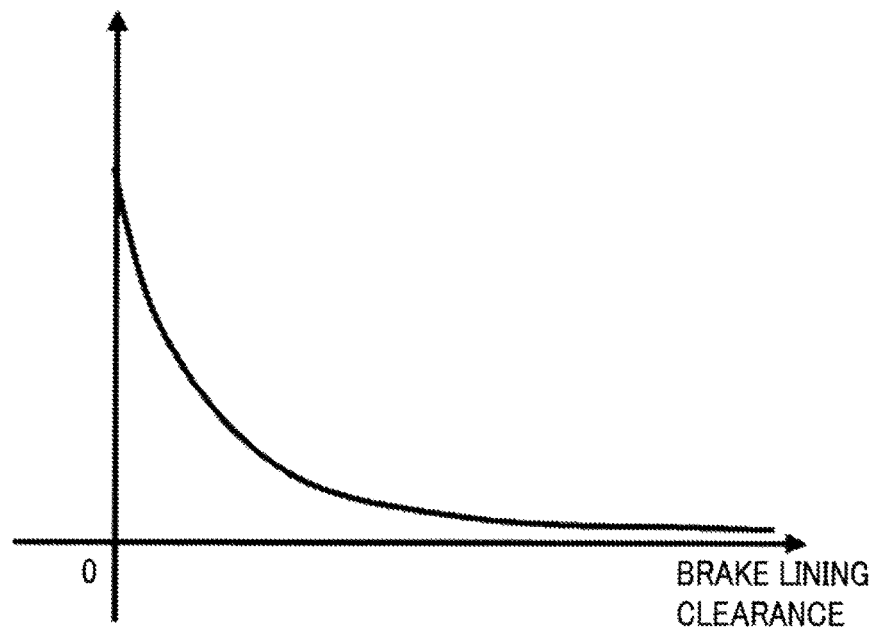
FIG. 3 shows a graph illustrating a relationship between a clearance and a braking force in the electric brake device.

For facilitation of better understanding of the discussion to come, FIG. 3 will firstly be referenced to explain the relationship between a braking force and a clearance for the frictional material 45. FIG. 3 shows a schematic diagram illustrating a relationship between a clearance, between the frictional material 45 and the brake rotor 41, and a generated braking force (drag torque). The intersection O of X-axis and Y-axis in the figure indicates a point of the clearance equal to zero. In case of a disc brake such as the one shown in FIG. 1, the intersection O may be defined as a point where the distance a, from a clamping surface formed by the frictional material 45B to a clamping surface formed by the frictional material 45 A on an opposing brake caliper pawl portion 46*a*, equals to the thickness b of the disc-shaped brake rotor 41. FIG. 1 shows a wide open clearance, and the distance a may become equal to the thickness b by causing the frictional materials 45A, 45B to move so as to eliminate this clearance.

Figure 6:
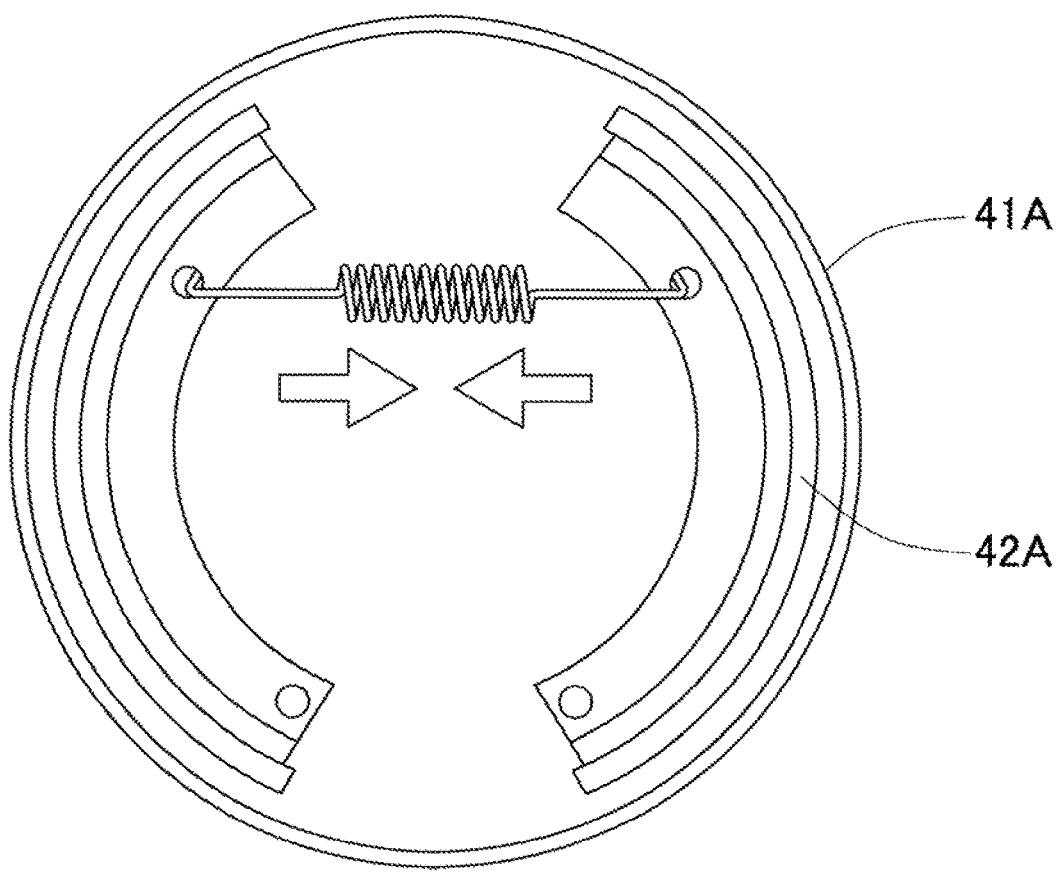
FIG. 6 shows a front elevational view of another example of the brake device main unit of the electric brake device.

In case of an electric brake device of a drum brake type such as the one shown in FIG. 6, the intersection O may be defined as a point where an outer diameter of an arc defined by a frictional material 42A in the form of a brake shoe equals to an inner diameter of a drum-shaped brake rotor 41A. In case of an electric brake device that, for example, detects an axial load applied to the motion converter mechanism (linear actuator) 44 to control a frictional material clamping force, the intersection O may be defined as a point where the axial load applied to the motion converter mechanism 44 is not greater than a predetermined value near zero.

Even when the clearance for the frictional material 45 is not smaller than zero, a braking force may in fact be generated, because of e.g. scooping of a holder mechanism by the frictional material 45, tilting of the brake rotor 41 and tilting of the brake caliper 46 due to its weight balance, resulting in undesirable contact of the frictional material. For instance, in case of a disc brake, it is typical to provide a clearance of approximately 0.2 to 0.3 mm at which a variation of drag torque can no longer be observed. Also in the embodiment under discussion, such a clearance of approximately 0.2 to 0.3 mm may be provided.

Figure 4A:
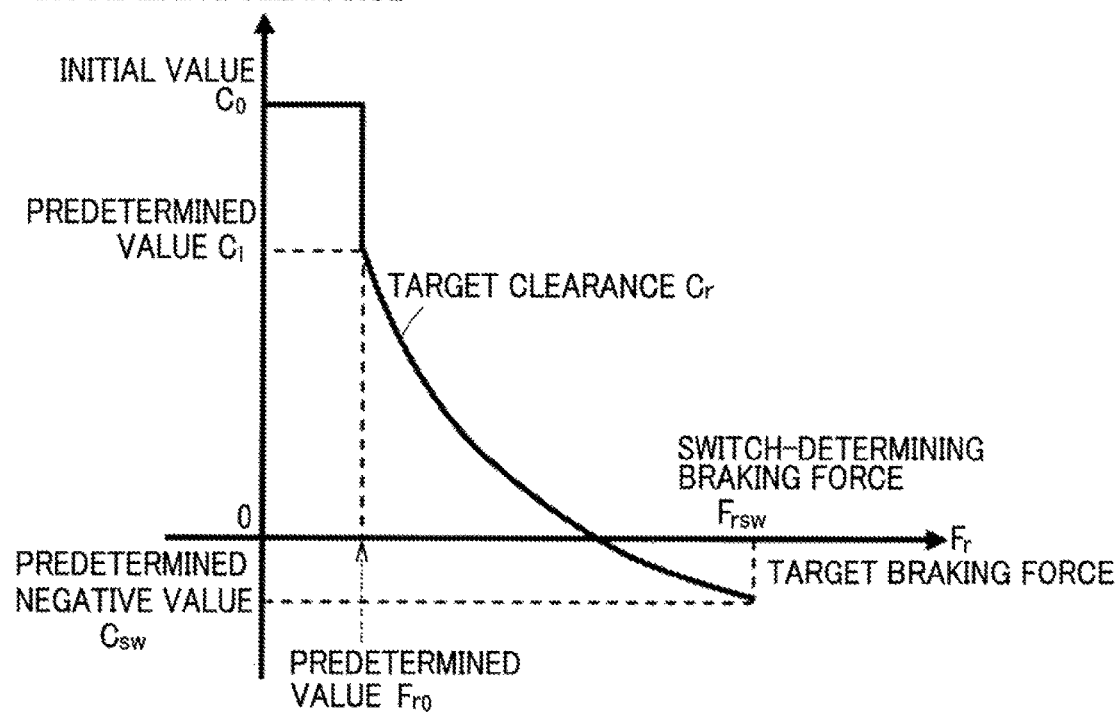
FIG. 4A shows a graph illustrating clearance control as a function of a target braking force in the electric brake device.

FIG. 4 shows respective controls, switching between which may be performed by switching control schemes between control based on the target braking force $F_r$ and control based on the target clearance $C_r$. FIG. 4A illustrates an example of how a clearance for the frictional material 45 is controlled according to a change of the target braking force $F_r$ in a regime where the target braking force Fr is relatively low.

With no request of a braking operation, a clearance for the frictional material 45 may be set to an initial value $C_0$ as shown in FIG. 4A, at which drag torque is sufficiently minimal. When a predetermined value $F_{r0}$ of substantially zero is requested for the target braking force $F_r$, the clearance may be decreased to a predetermined value $C_1$. This is because, with larger clearances, a smaller variation of a generated braking force and therefore a smaller variation of drag torque occurs—as can be seen from FIG. 3—and thus decreasing the clearance therefrom to achieve a more rapid braking response may be possible without bringing a significant change in a braking force. Such a stage may be omitted so that the clearance of the initial value $C_0$ is also given at the target braking force equal to $F_{r0}$. The corresponding target clearance definer 16a may store any of these relations such as a relationship between a target braking force $F_r$ and a target clearance $C_r$.

A measure for controlling the clearance such that the clearance has the aforementioned value $C_0$ over a range from the target braking force $F_r$ equal to 0 to the target braking force $F_r$ equal to the predetermined value $F_{r0}$ of substantially zero, as mentioned above, may be the aforementioned minimum value case controller 16c.

Over a range from the target braking force $F_r$ equal to the predetermined value $F_{r0}$ to the target braking force $F_r$ equal to the switch-determining braking force $F_{rsw}$, the clearance for the frictional material 45 may be controlled such that the clearance changes from $C_1$ to, for example, a predetermined negative value $C_{sw}$ as shown in FIG. 4A. A braking force exhibits non-linearity with respect to a clearance, as already described. By defining the target clearance $C_r$ non-linearly with respect to the target braking force $F_r$ like, such as, the one shown in FIG. 4A, the resulting generated braking force (drag torque) will exhibit substantially linearity with respect to the target braking force $F_r$. For reduction of computational complexity, correlation between the target braking force $F_r$ and the target clearance $C_r$ may be defined as a simple linear correlation.

By defining the predetermined value $C_{sw}$ as a value lower than zero as shown in FIG. 4A, a detectable braking force with sufficient accuracy can be generated when switching into braking force control, thereby avoiding possible uncertainties of estimating undetectably low braking forces. The predetermined value $C_{sw}$ may be defined as any given value based on a relationship between a previously measured clearance and a result of estimation of a braking force. A relationship between a target braking force $F_r$ and a target clearance $C_r$ such as the one shown in FIG. 4A may be stored in the corresponding target clearance definer 16a.

Figure 4B:
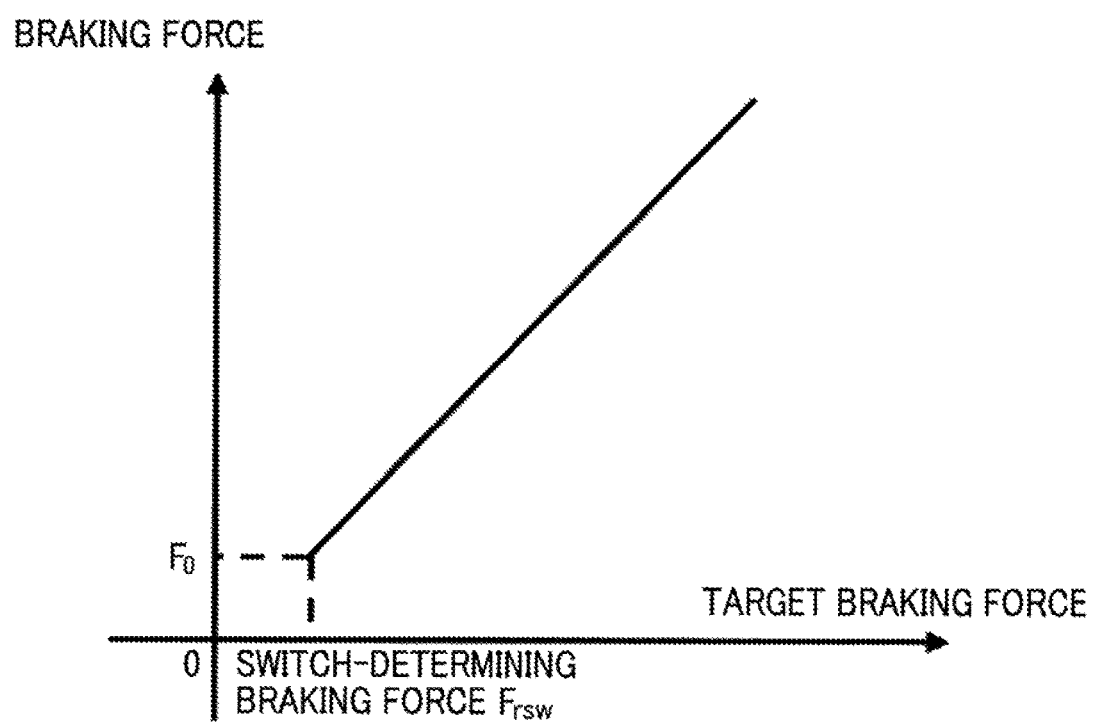
FIG. 4B shows a graph illustrating braking force control as a function of a target braking force in the electric brake device.

FIG. 4B illustrates an example of how a braking force is controlled where the target braking force $F_r$ is equal to or greater than the switch-determining braking force $F_{rsw}$.

The switching coinciding corrector 17 may facilitate a smooth switching operation of switching between these clearance control and braking force control. The switching coinciding corrector 17 may, for example, correct an absolute value of a braking force F estimated by the braking force estimator 11 at the estimated braking force FO corresponding to the switch-determining braking force $F_{rsw}$, such that the corrected absolute value coincides with a braking force that is generated when the clearance for the frictional materials 45A, 45B is equal to the predetermined negative value $C_{sw}$. By performing such a correction, possible discrepancy of a braking force due to estimation error of the clearance for the frictional materials 45A, 45B when switching from one control to another may be avoided.

Put in different terms, the switching coinciding corrector 17 may be implemented by hardware circuitry or software functions that may use, for example, the implementation model to apply correction such as the one described above on at least one of the target clearance $C_r$ and the target braking force $F_r$, such that a braking force, achieved when the clearance reaches a clearance corresponding to the switch-determining braking force $F_{rsw}$ during control according to the target clearance $C_r$ performed by the clearance controller 14, coincides with a braking force achieved when switching takes place from control performed by the clearance controller 14 into control according to the target braking force $F_r$ performed by the braking force controller 7.

The switching coinciding corrector 17 may not always be activated. Rather, the coinciding correction execution determiner 18 may cause the switching coinciding corrector 17 to be activated only under appropriate circumstances. For example, the coinciding correction execution determiner 18 may not cause the aforementioned correction to be performed if a considerably high target braking force $F_r$ is requested with urgency, resulting in far away from an actual braking force. As long as the target braking force $F_r$ is far away from an actual braking force, rapid change of a braking force may be effected without being affected by possible discrepancy of the braking force that may occur when switching from one control scheme to another. Thus, choosing not to perform such correction may allow for more rapid increase of a braking force.

Put in different terms, the coinciding correction execution determiner 18 may be implemented by hardware circuitry or software functions that may use, for example, the implementation model such as the one described above to cause the switching coinciding corrector 17 to perform the correction only if one of a deviation of the clearance C estimated by the clearance estimator 13 with respect to the target braking force $F_r$ and a deviation of the braking force F estimated by the braking force estimator 11, as estimated when the clearance reaches a clearance corresponding to the switch-determining braking force $F_{rsw}$ during control performed by the clearance controller 14 according to the target clearance $C_r$, is equal to or smaller than a predetermined value. The "predetermined value" may be defined appropriately using, for example, results from experiment(s) and/or results from simulation(s).

For the aforementioned correction, in a segment spanning to a braking force which is greater than the switch-determining braking force $F_{rsw}$ by a predetermined value, a correction eliminating segment may be provided for bringing the amount of the correction down to zero. The correction eliminating segment may have a fixed value or may have a varying value that depends on the correction amount. Control using such a correction eliminating segment may be performed by the coinciding correction execution determiner 18 or may be performed by the switching coinciding corrector 17.

The coinciding correction amount eliminator 19 may, upon correction performed by the switching coinciding corrector 17, subsequently eliminate—that is, reduce—the correction amount in a progressive manner. With such elimination of the correction amount, switching into appropriate control performed by the braking controller 7 may be made possible without being odd. The coinciding correction amount eliminator 19 may, subsequent to the correction performed by the switching coinciding corrector 17, for example, vary the correction amount such that the correction amount gradually approaches zero until the target braking force $F_r$ reaches a value that is greater than the switch-determining braking force $F_{rsw}$ by a predetermined value. If the correction is intended to correct an offset, the coinciding correction amount eliminator 19 may be an offset eliminator.

Also, the coinciding correction amount eliminator 19 may vary, subsequent to the correction performed by the switching coinciding corrector 17 and if the target braking force $F_r$ changes at a rate of change greater than a predetermined gradient—that is, a predetermined rate of change, the correction amount such that the correction amount approaches zero. Also, the coinciding correction amount eliminator 19 may vary, subsequent to the correction performed by the switching coinciding corrector 17, correction amount such that the correction amount approaches zero with passage of time. In particular, the coinciding correction amount eliminator 19 may be implemented by hardware circuitry or software functions that may receive inputs of e.g. a target braking force $F_r$, a switch-determining braking force $F_{rsw}$ and an output from a timer (not shown) to reduce the correction amount in a progressive manner using the aforementioned instantiation model.

For simpler processing, correction of e.g. the aforementioned offset may be disabled or may not be caused while a braking operation is being effected. When a braking operation is no longer effected, the correction amount of e.g. an offset may be reset.

In the embodiment under discussion, as will be described below, the following configuration for e.g. facilitating a smooth switching operation—which may take place in response to decrease of a target braking force—from control performed by the braking force controller 7 to control performed by the clearance controller 14 may be provided. The target clearance $C_r$ in the clearance controller 14 may be defined such that the clearance C estimated by the clearance estimator 13, as estimated when a braking force F estimated by the braking force estimator 11 is down to the switch-determining braking force $F_{rsw}$, coincides with a clearance corresponding to the switch-determining braking force $F_{rsw}$ during control performed by the clearance controller 14. With such a configuration, possible discrepancy of a braking force when switching from one control scheme to another—due to e.g. estimation error of a clearance—may be avoided.

Figure 2:
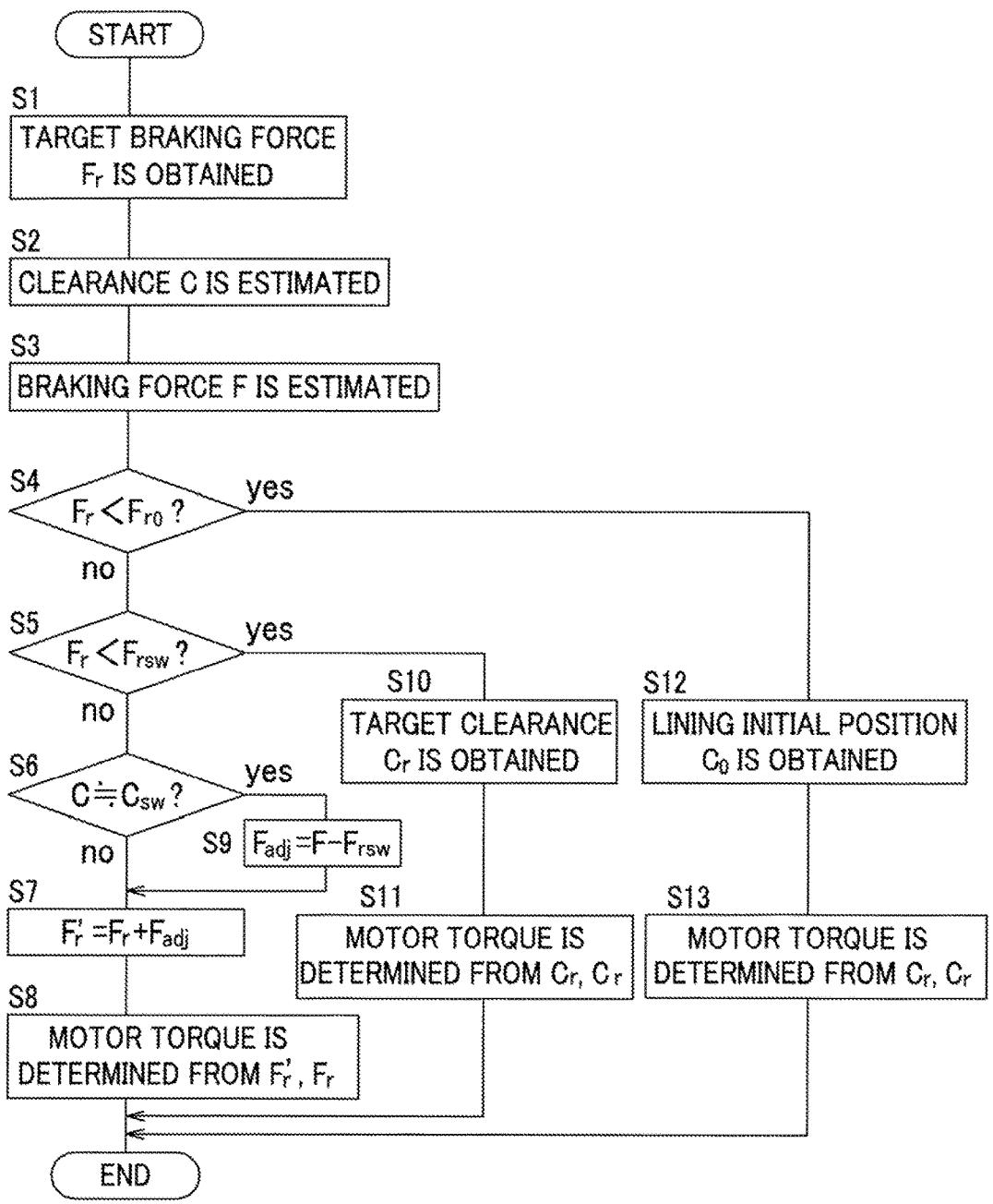
FIG. 2 shows a flow chart of an example of an operation of the electric brake device.

FIG. 2 shows a flow chart of the overview of an example of a control operation carried out by the brake controller unit 2. In the brake controller unit 2, firstly, a target braking force $F_r$, an estimated clearance C, and an estimated braking force F may be caused to be obtained from the superordinate ECU 4, the clearance estimator 13, and the braking force estimator 11, respectively, that are shown in FIG. 1 (step S1 to step S3).

At step S4, the target braking force $F_r$ may be compared with a predetermined value $F_{r0}$ of substantially zero (FIG. 4A). If the target braking force $F_r$ is below the predetermined value $F_{r0}$, a clearance $C_0$ which represents an initial position of a brake lining 42 may be obtained for clearance control (step S12). The clearance $C_0$ may be defined as a target clearance $C_r$, and a motor torque for bringing the estimated clearance C to the clearance $C_0$ may be determined (step S13). A measure for controlling the estimated clearance C such that the estimated clearance C is maintained at the clearance $C_0$ representing such an initial position may be the minimum value case controller 16c which is illustrated in FIG. 1.

At step S4, if it is determined that the target braking force $F_r$ is equal to or greater than the predetermined value $F_{r0}$, it may proceed to step S5 where the target braking force $F_r$ is compared with a switch-determining braking force $F_{rsw}$. If the target braking force $F_r$ is below the switch-determining braking force $F_{rsw}$, it may proceed to step S10 where the target clearance $C_r$ is obtained in the clearance controller 14. A motor torque for causing the estimated clearance C to follow the target clearance $C_r$ may be determined (step S11).

At step S5, if it is determined that the target braking force $F_r$ is equal to or greater than the switch-determining braking force $F_{rsw}$, the following braking force control may be carried out.

During this braking force control, firstly, the clearance C estimated by the clearance estimator 13 may be compared with the predetermined negative value $C_{sw}$ (FIG. 4A) (step S6). If the estimated clearance C is substantially equal to the predetermined value $C_{sw}$, it may proceed to step S9 where a difference between the estimated braking force F and the switch-determining braking force $F_{rsw}$ is determined or calculated as a correction amount $F_{adj}$, and may then proceed to step S7. If the estimated clearance C is not substantially equal to the predetermined value $C_{sw}$, it may proceed directly to step S7. The correction amount $F_{adj}$ in the latter case may be set to an initial value (for example, zero). Note that these two being "substantially equal" means that the difference between these two is minimal—implying that the difference is equal to or smaller than a predetermined value—or is zero.

At step S7, a sum of the target braking force $F_r$ and the correction amount $F_{adj}$ may be calculated to determine a corrected target braking force $F_r'$. A motor torque for causing the estimated braking force F to follow the corrected target braking force $F_r'$ may be determined (step S8).

Such an electric brake device, which may carry out clearance control when the frictional materials 45A, 45B are in approximate-contact state (with a small clearance) as described above, may enable, when a low braking force is being effected, achieving improved maneuverability, improved followability towards a target braking force and enhanced brake feeling.

Although the present invention has been described in connection with the preferred embodiments thereof with reference to the accompanying drawings, those skilled in the art will readily conceive numerous changes and modifications as long as they are evident upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . brake main unit
2 . . . brake controller unit
7 . . . braking force controller
11 . . . braking force estimator
12 . . . motor rotational angle estimator
13 . . . clearance estimator
14 . . . clearance controller
15 . . . control scheme switching determiner module
16 . . . clearance control execution module
17 . . . switching coinciding corrector
18 . . . coinciding correction execution determiner
19 . . . coinciding correction amount eliminator
41 . . . brake rotor
42 . . . frictional material mount
43 . . . motor
44 . . . motion converter mechanism
45, 45A, 45B . . . frictional material
$C_r$ . . . target clearance
$F_r$ . . . target braking force
$F_{rsw}$ . . . switch-determining braking force
$\theta$ . . . rotational angle

What is claimed is:

1. An electric brake device comprising:
a brake rotor;
a frictional material configured to come into contact with the brake rotor;
an electric motor;
a motion converter mechanism configured to convert a driving force of the motor into a motion of the frictional material in a direction towards or away from the brake rotor; and
a brake controller unit, the brake controller unit including:
a motor rotational angle estimator configured to estimate a rotational angle of the motor;
a braking force estimator configured to estimate a braking force that is actually being generated;
a braking force controller configured to control the braking force by controlling the motor in such a way to follow a given target braking force;
a clearance estimator configured to, based on the estimated rotational angle, estimate a clearance, inclusive of negative values, between the frictional material and the brake rotor; and
a clearance controller configured to compare the target braking force with a predetermined switch-determining braking force, to generate, if the target braking force is below the switch-determining braking force, a target clearance, the target clearance being a clearance between the frictional material and the brake rotor which approaches zero or a predetermined negative value as the target braking force increases, and to use the estimated clearance to control the motor to follow the target clearance, in place of control performed by the braking force controller according to the target braking force.

2. The electric brake device as claimed in claim 1, wherein the clearance estimator is configured to estimate, if the target braking force is equal to or greater than a predetermined value which is smaller than the switch-determining braking force, the clearance based on a relationship between at least two of: the braking force estimated by the braking force estimator; the rotational angle of the motor estimated by the motor rotational angle estimator; and respective derivative values of these braking force and rotational angle.

3. The electric brake device as claimed in claim 1, further comprising:
a switching coinciding corrector configured to apply correction on at least one of the target clearance and the target braking force, such that a braking force, achieved when the clearance reaches a clearance corresponding to the switch-determining braking force during control according to the target clearance performed by the clearance controller, coincides with a braking force achieved when switching takes place from control performed by the clearance controller into control performed by the braking force controller according to the target braking force.

4. The electric brake device as claimed in claim 3, further comprising:
a coinciding correction execution determiner configured to cause the correction by the switching coinciding corrector to be performed only if one of a deviation of the clearance estimated by the clearance estimator with respect to the target braking force and a deviation of the braking force estimated by the braking force estimator, as estimated when the clearance reaches a clearance corresponding to the switch-determining braking force during control performed by the clearance controller according to the target clearance, is equal to or smaller than a predetermined value.

5. The electric brake device as claimed in claim 3, further comprising:
a coinciding correction amount eliminator configured to vary correction amount, subsequent to the correction performed by the switching coinciding corrector, such that the correction amount gradually approaches zero until the target braking force reaches a value that is greater than the switch-determining braking force by a predetermined value.

6. The electric brake device as claimed in claim 3, further comprising:
a coinciding correction amount eliminator configured to vary correction amount, subsequent to the correction performed by the switching coinciding corrector and if the target braking force $F_r$ changes at a rate of change greater than a predetermined rate of change, such that the correction amount approaches zero.

7. The electric brake device as claimed in claim 3, further comprising:
a coinciding correction amount eliminator configured to vary correction amount, subsequent to the correction performed by the switching coinciding corrector, such that the correction amount approaches zero with passage of time.

8. The electric brake device as claimed in claim 1, wherein the target clearance in the clearance controller is defined such that the clearance estimated by the clearance estimator, as estimated when the braking force estimated by the braking force estimator is down to the switch-determining braking force during control performed by the braking force controller, coincides with a clearance corresponding to the switch-determining braking force during control performed by the clearance controller.

* * * * *